(12) United States Patent
Ludtke

(10) Patent No.: US 6,202,210 B1
(45) Date of Patent: Mar. 13, 2001

(54) METHOD AND SYSTEM FOR COLLECTING DATA OVER A 1394 NETWORK TO SUPPORT ANALYSIS OF CONSUMER BEHAVIOR, MARKETING AND CUSTOMER SUPPORT

(75) Inventor: Harold Aaron Ludtke, San Jose, CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/138,815

(22) Filed: Aug. 21, 1998

(51) Int. Cl.[7] ....................................... H04N 7/16
(52) U.S. Cl. ............................. 725/20; 725/16; 725/80; 725/85
(58) Field of Search ................... 348/1, 10, 11, 348/8, 12, 13; 455/2, 6.2, 6.3; 345/9, 327

(56) References Cited

U.S. PATENT DOCUMENTS

| | | | |
|---|---|---|---|
| 4,905,080 | * | 2/1990 | Watanabe et al. ............ 348/13 |
| 5,659,539 | * | 8/1997 | Porter et al. ............ 395/200.61 |
| 5,666,363 | * | 9/1997 | Osakabe et al. ............ 370/426 |
| 5,802,017 | * | 9/1998 | Sato et al. ............ 369/2 |
| 5,872,588 | * | 2/1999 | Aras et al. ............ 348/1 |
| 6,032,202 | * | 2/2000 | Lea et al. ............ 710/8 |

OTHER PUBLICATIONS

C. Chilamakuri; "Apparatus for and Method of Automatically Gathering Consumer Statistics and Data from a Network Structure"; filed Sep. 30, 1997; Serial No.:08/940,708.

* cited by examiner

*Primary Examiner*—Chris Grant
(74) *Attorney, Agent, or Firm*—Wagner, Murabito & Hao LLP

(57) ABSTRACT

A data collection system for use with a home AV network. The home AV network includes a plurality of consumer electronic devices communicatively coupled via an IEEE 1394 based network. A receiver device is included in the plurality of devices. The receiver device functions by receiving a broadcast data stream for displaying or playing for the user, wherein the broadcast data stream includes an identifier tag describing the identity or content of the broadcast data stream. At least one of the plurality of consumer electronic devices includes an up-stream communications link capable of sending information up-stream from the user's home. Additionally, at least one of the consumer electronic devices includes a computer system, the computer system including a processor coupled to a memory via a bus. The memory stores software which when executed by the processor causes the computer system to implement a data collection method comprising the steps of monitoring the identifier tag included in the broadcast data stream, determining an identity of the broadcast data stream using the identifier tag, and transmitting the identity of the broadcast data stream to an external monitor via the up-stream communications link.

31 Claims, 7 Drawing Sheets

300

| TUNER OUTPUT | | |
|---|---|---|
| ID tag | START TIME | STOP TIME |
| 1223445566 | 123000 | 143000 |
| . | . | . |
| . | . | . |
| . | . | . |
| . | . | . |
| . | . | . |
| . | . | . |
| . | . | . |
| . | . | . |

METHOD AND SYSTEM FOR COLLECTING DATA OVER A 1394 NETWORK TO SUPPORT ANALYSIS OF CONSUMER BEHAVIOR, MARKETING AND CUSTOMER SUPPORT

FIELD OF THE INVENTION

The field of the present invention pertains to home network audio-video systems. More particularly, the present invention pertains to the use of a networked audio-video system to collect information about the user's behavior.

BACKGROUND OF THE INVENTION

A typical home audiovisual equipment set up includes a number of components. For example, a radio receiver, a CD player, a pair of speakers, a television, a VCR, a tape deck, and the like. Each of these components is connected to each other via a set of wires. One component is usually the central component of the home audiovisual system. This is usually the radio receiver, or the tuner. The tuner has a number of specific inputs for coupling the other components. The tuner has a corresponding number of control buttons or control switches which provide a limited degree of controllability and interoperability for the components. A user controls the home audiovisual system by manipulating the buttons and switches on the front of the tuner, or alternatively, manipulating buttons on a hand-held remote control unit.

This conventional home audio-video (AV) system paradigm has become quite popular. However, the emergence of networking and interface technology (e.g., IEEE 1394 serial communication bus and the wide spread adoption of digital systems) promises a whole new paradigm of home AV devices. The latest and most popular consumer AV devices (e,g., digital TV, DVD players, digital camcorders, mini-disk players, and the like) are based upon digital technology. The devices include sophisticated embedded computer systems. The devices deliver greatly enhanced functionality and features, as their embedded systems execute elaborate software-based algorithms and are highly configurable, depending upon the desires and tastes of the user.

The digital nature of the devices allow them to be readily networked into a coherent digital home AV network. Several standards have emerged which define the interfaces and connections for such networks. Currently, the most popular transport technology for digital home AV networks is IEEE 1394. The IEEE 1394 serial bus, often referred to as FireWire™ provides a high bandwidth communications protocol upon which an open, intelligent, self-configuring, extensible home AV network architecture can be implemented.

However, while the nature and capabilities of home AV systems have changed dramatically, data collection practices by consumer mass market data collection agencies have not. In essentially the same manner as in many years past, consumer mass market data collection agencies, such as, for example, Nielson (e.g., responsible for television's Nielson ratings), collected data by placing an extra, dedicated box in the homes of participating consumers. In the case of Nielson, the boxes have the ability to analyze what the consumer is watching on television and to collect and forward this data to interested parties.

Other means of data collection include the well known and familiar "send in your registration card" concept where the purchaser of a consumer product finds within the product's packaging a card which includes a short survey for the purchaser to fill out and send in. Another example is in-person canvassing, wherein a person, either in public locations such as shopping malls or over the phone, physically queries members of the public regarding their purchasing habits, tastes, etc. Yet another example of data collection is "Hands up" marketing, in which special offers are made if consumers respond to questionnaires or send in requests for additional information.

While the above methods may remain marginally effective for some time to come, none of the above solutions has evolved in step with the changes in home AV systems. None of the above solutions utilizes the digital architecture of new home AV systems. None of the above methods leverage the intelligence of the latest AV devices.

SUMMARY OF THE INVENTION

Thus, what is required is a solution which leverages the intelligence of the latest home AV devices for the purposes of data collection and retrieval. What is required is a data collection and retrieval solution which functions seamlessly with modern home AV networks. The required solution should be readily extensible, self-configuring, and capable of accommodating new AV devices, whose capabilities and features may presently be unknown, as they are added to a home AV network over its life time. The required solution should be based on open industry standards, such as the AV/C standard. The required solution should guarantee that all such AV/C-compliant devices can be communicated with, controlled, and enjoyed by the user. The present invention provides a novel solution to the above requirements.

The present invention provides a solution which leverages the intelligence of the latest home devices for the purposes of data collection and retrieval. The system of the present invention functions seamlessly with modern home AV networks and is readily extensible, self-configuring, and capable of accommodating new AV devices, even though the capabilities and features of the devices can be unknown. The present invention is extensible to accommodate new devices as they are added to a home AV network over its life time and is based on open industry standards, such as the AV/C standard. Consequently, the present invention can guarantee that all such AV/C-compliant devices can be communicated with, controlled, and enjoyed by the user.

In one embodiment, the present invention comprises a data collection system for use with a home AV network. The home AV network includes a plurality of consumer electronic devices communicatively coupled via an IEEE 1394 based network. At least one of the devices coupled to the home AV network includes an embedded computer system having sufficient resources to function as a platform for software implementing the functionality of the present invention. This device, for example, a receiver device, functions in part by receiving a broadcast data stream for displaying or playing for the user, wherein the broadcast data stream includes an identifier tag describing the identity or content of the broadcast data stream, interacting with the user by displaying system status, accepting user commands via remote control, controlling other devices coupled to the home AV network, etc.

At least one of the plurality of consumer electronic devices includes an up-stream communications link capable of sending information up-stream from the user's home (e.g., a telephone modem). The embedded computer system of the receiver runs a monitor program which implements the data collection functionality of the present invention. The monitor program uses the communications capabilities of IEEE 1394 to examine the data streams of information flowing between the devices of the home network in order to monitor identifier tags included in the data streams. The monitor is able to determine an identity of the broadcast data stream using the identifier tag, and transmit the identity of the broadcast data stream to an external monitor via the up-stream communications link. In addition to identity, the identifier tags can carry various other data items relating to a particular data stream. Such items include, for example, the origin of the data stream (e.g., CNN, NBC, CBS, etc.), the start time, stop time, and the like.

The information obtained from the identifier tags is stored in a history file and cataloged such that the history file reflects the activity of the home AV network over the period of monitoring. The history file is then periodically transmitted up-stream to a central data collection facility for further analysis, study, or the like, using the up-stream communications link. In this manner, the data collection process of the present invention leverages the intelligence of the latest home AV devices for the purposes of data collection and retrieval and is able to function seamlessly within the modern home AV network.

BRIEF DESCRIPTION OF THE DRAWINGS

The present invention is illustrated by way of example and not by way of limitation in the figures of the accompanying drawings in which like reference numerals refer to similar elements and in which:

FIG. 3 shows a history file 300 in accordance with one embodiment of the present invention.

DETAILED DESCRIPTION OF THE INVENTION

Figure 1A:
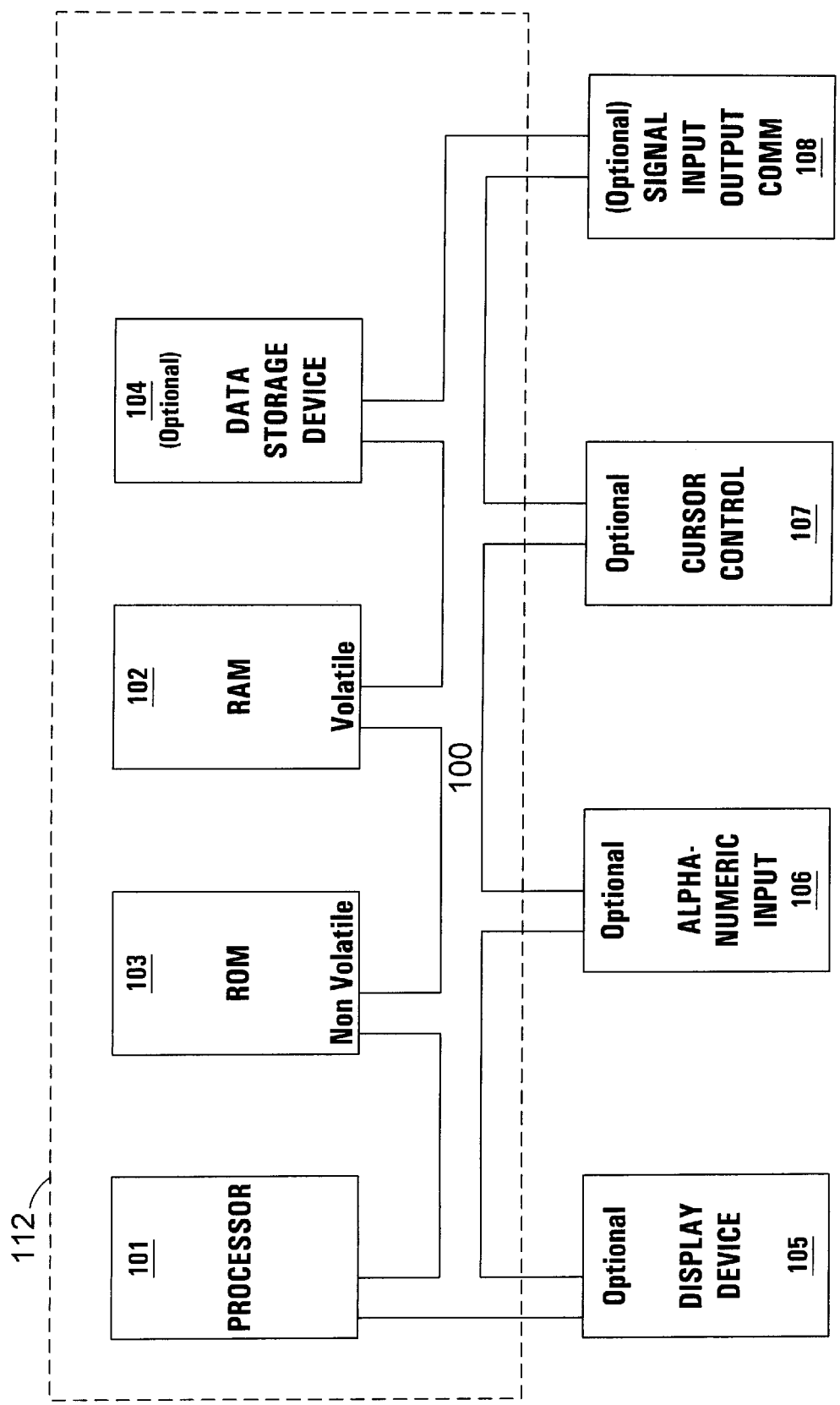
FIG. 1A shows a computer system environment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

The present invention provides a s solution which leverages the intelligence of the latest home AV devices for the purposes of data collection and retrieval. The system of the present invention functions seamlessly with modern home AV networks and is readily extensible, self-configuring, and capable of accommodating new AV devices, even though the capabilities and features of the devices can be unknown. The present invention is extensible to accommodate new devices as they are added to a home AV network over its life time, and is based on open industry standards, such as the AV/C standard. Consequently, the present invention can guarantee that all such AV/C-compliant devices can be communicated with, controlled, and enjoyed by the user.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "translating," "instantiating," "determining," "displaying," "recognizing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

Computer System Environment

Referring to FIG. 1A, a computer system 112 is illustrated. Within the following discussions of the present invention, certain processes and steps are discussed that are realized, in one embodiment, as a series of instructions (e.g., software program) that reside within computer readable memory units of system 112 and executed by processors of system 112. When executed, the instructions cause computer system 112 to perform specific actions and exhibit specific behavior which is described in detail to follow.

In general, computer system 112 used by the present invention comprises an address/data bus 100 for communicating information, one or more central processor(s) 101 coupled with bus 100 for processing information and instructions, a computer readable volatile memory unit 102 (e.g., random access memory, static RAM, dynamic RAM, etc.) coupled with bus 100 for storing information and instructions for the central processor(s) 101, a computer readable non-volatile memory unit 103 (e.g., read only memory, programmable ROM, flash memory, EPROM, EEPROM, etc.) coupled with bus 100 for storing static information and instructions for processor(s) 101. System 112 can optionally include a mass storage computer readable data storage device 104, such as a magnetic or optical disk and disk drive coupled with bus 100 for storing information and instructions. Optionally, system 112 can also include a display device 105 coupled to bus 100 for displaying information to the computer user, an alphanumeric input device 106 including alphanumeric and function keys coupled to bus 100 for communicating information and command selections to central processor(s) 101, a cursor control device 107 coupled to bus 100 for communicating user input information and command selections to the central processor(s) 101, and a signal input/output device 108 coupled to the bus 100 for communicating messages, command selections, data, etc. to and from processor(s) 101.

Figure 1B:
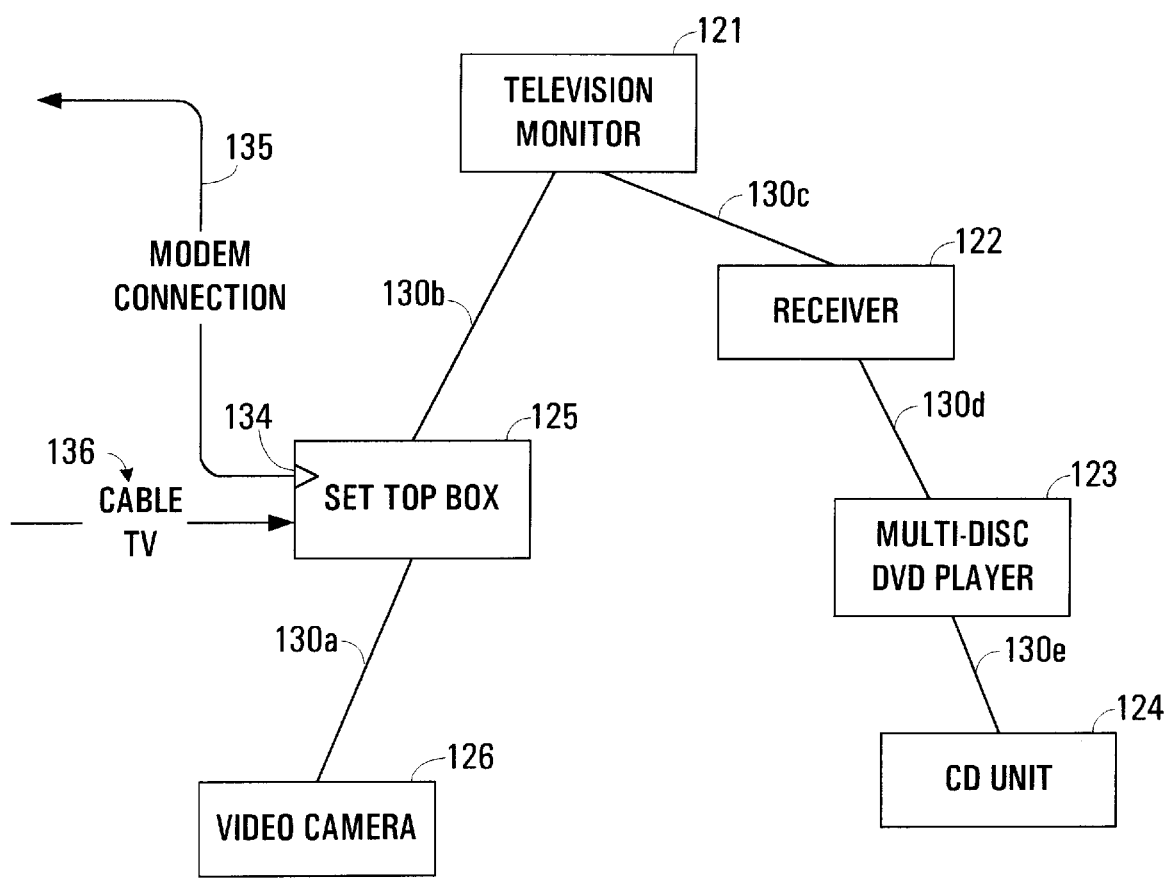
FIG. 1B shows a home AV network in accordance with one embodiment of the present invention.

With reference now to FIG. 1B, a home AV network 120 in accordance with one embodiment of the present invention is shown. Network 120 includes 6 devices, a television monitor 121, a receiver 122, a multi-disc-type player/recorder 123, a CD unit 124, a set top box 125, and a video camera 126. Each of the devices 121–126 is communicatively coupled via respective IEEE 1394 bus links 130*a* through 130*e* to form a single network, wherein each device on the network can communicate with any other device on the network (e.g., in accordance with well known IEEE 1394 bus protocols). While network 120 is shown including 6 devices, it is understood that network 120 is suited to include any number of devices up to the physical limits of the bus technology (e.g., 63 devices for IEEE 1394).

The IEEE 1394 serial bus used by network 120 of FIG. 1B is a high-speed bus architecture for interconnecting digital devices thereby providing a universal input/output connection. The IEEE 1394 standard defines a digital interface for the applications, thereby eliminating the need for an application to convert digital data to analog data before it is transmitted across the bus. Correspondingly, a receiving application receives digital data from the bus, not analog data, and therefore is not required to convert analog data to digital data. The cable required by the IEEE 1394 standard is very thin in diameter compared to other bulkier cables used to connect such devices. Devices can be added to and removed from an IEEE 1394 bus while the bus is active. If a device is so added or removed, the bus automatically reconfigures itself for transmitting data between the then existing nodes. A node is considered a logical entity having a unique address on the bus structure. Each node provides an identification ROM, a standardized set of control registers, and its own address space.

The IEEE 1394 communication standard of network 120 of FIG. 1B supports isochronous data transfers of digital encoded information. Isochronous data transfers are real-time transfers which take place such that the time intervals between significant instances have the same duration at both the transmitting and receiving applications. Each packet of data transferred isochronously is transferred in its own time period. An example of an application for isochronous data transfer is from a set top box 125 to a television monitor 121. Set top box 125 receives the video stream from a cable company and divides the stream into discrete packets. Set top box 125 then transfers each packet, representing the images and sounds recorded over a limited time period for display by television monitor 121. The IEEE 1394 standard bus architecture provides multiple channels for isochronous data transfers between applications. Specifically, a six bit channel number is broadcast with the data to ensure reception by the appropriate application. This allows multiple applications simultaneously to transmit isochronous data across the bus structure. Asynchronous transfers are traditional data transfer operations which take place as soon as possible and transfer an amount of data from a source to a destination.

It should be appreciated that the present invention is equally well suited for home AV networks based upon other well known network or bus standards in addition to IEEE 1394. Such standards include, for example, ethernet, universal serial bus, token ring, and the like. Accordingly, the IEEE 1394 structure of network 120 is shown and described herein as an example bus architecture only.

In the present embodiment, set top box 125 is coupled to a cable TV line 136 to receive video and audio information (e.g., television programming). Additionally, set top box 125 includes a modem 134 coupled to a modem connection 135 for "up-stream" communication back to, for example, a cable television company, pay per view company, home shopping company, or the like. This up-stream communications link of modem connection 135 enables the data collection and automated retrieval system of the present invention.

For example, in a case where data regarding the viewing habits of a user is to be collected and retrieved, the present invention automatically collects the desired data and automatically transmits this information up-stream to, for example, the cable television company via modem connection 135.

Set top box 134 receives a broad cast data stream, in this case, digital cable television programming, via the "down-stream" path of cable TV line 136. This information is subsequently routed to receiver 122 for decoding and subsequent display on television monitor 121 (alternatively, set top box 125 can directly decode and couple the resulting information to television monitor 121). Receiver 122 functions by receiving the broadcast data stream from set top box 125, translating this stream into the appropriate digital video format, and outputting a resulting video stream to television monitor 121 where it is displayed for the user.

In accordance with the present invention, this broadcast data stream includes periodic identifier tags (ID tags) which both identify the broadcast data stream (e.g., program originator, program name, etc.) and provide information regarding its contents (e.g., program total length, program time remaining, etc.). A data collection program executes on an embedded computer system included within one of devices 121–126 of network 120. In the present embodiment, the data collection program executes on the embedded computer system (e.g., computer system 112 of FIG. 1A) built into receiver 122.

Using the IEEE 1394 communications links of network 120, the monitor program has access to each of devices 121–126. As such, the monitor program is able to analyze and catalog information regarding the inputs, outputs, internal configuration, and the like, of any of devices 121–126.

In this example, the monitor program "snoops" the ID tags included in the broadcast data stream to determine information regarding the programming being displayed on television monitor 121. This information is tabulated and stored in the memory of the embedded computer system as a "history" file. As the programming being displayed on television monitor 121 changes (e.g., channel surfing by the user), the monitor program continually snoops the ID tags of the broadcast data stream and continually tabulates and stores this information in the history file. Hence, after a period of time, the history file contains a fairly complete record of the viewing habits of the user. The history file is then transmitted up-stream, in this example, to a central data collection facility on the premises of the cable television company. The monitor program periodically sends the history file (e.g., once a day) to a central data collection server at the central data collection facility via modem 134 and modem connection line 135 of set top box 125. The history file is transferred to set top box 125 via the IEEE 1394 communications links of network 120.

This is one example of the automated data collection and retrieval capability of the present invention. The monitor program of the present invention leverages the intelligence of devices 121–126 in the home AV network 120 to collect data seamlessly and send data up-stream to an interested party. In the television programming example above, the collected data is used to determine the viewing habit of a television audience, in much the same manner as the well known "Nielson Ratings" system.

It should be appreciated, however, that the data collection and retrieval system of the present invention is well suited to the collection of many other types of data in addition to television viewing history data. A home AV network (e.g., network 120) in accordance with the present invention can collect a variety of data useful in the analysis of the viewing and purchasing habits of consumers. Such data can include the most watched television programming, the most watched commercials (in comparison to those commercials "channel surfed" over by the consumer), home shopping purchasing decisions, the title and content of prerecorded media (e.g., DVD, VCR tape, laser disc, etc.) played by the consumer, or virtually any other interaction between the user and the home AV network.

This data can then be analyzed by any interested parties to determine how these habits affect future business practices of the parties. Business practices might include the scheduling of television broadcasts, test marketing of products which are complimentary to the products which are already in the consumer's home AV network, or even monitoring the equipment and software for upgrade and service opportunities. Additionally, the system of the present invention offers a revenue-generating stream for consumer electronic product manufacturers because, by modifying their existing products appropriately, they can arrange to collect a royalty from the companies that want this data.

Thus, the present invention is capable of wholly replacing other prior art means of data collection (e.g., including the standard "send in your registration card" concept, in-person canvassing, phone surveys, etc.). The present invention leverages the intelligence and communications capabilities of the IEEE 1394 protocols which underlie modern home AV networks (e.g., network 120). The present invention utilizes existing home AV network IEEE 1394 devices (e.g., a AV/C tuner, AV/C disc, modem, etc.). Accordingly, there is no need to define special purpose devices. None of the above prior art data collection means utilizes IEEE 1394.

Referring still to FIG. 1B, it should be appreciated that the data collection and retrieval activities of the present invention can be implemented using any of devices 121–126. Using the well known AV/C and IEEE 1394 protocols, the monitor program is able to execute from any embedded computer system coupled to network 120, in addition to the embedded computer system 112 built into receiver 122.

It should also be appreciated that the specific implementation of the present invention depends upon the characteristics of the particular use contemplated by the designer (e.g., of receiver 122). For example, in those situations where real-time type information is needed, it is advantageous to collect and store the information on one of devices 121–126, such as a hard drive or other type of mass storage device built into one of devices 121–126 (e.g., data storage device 104 of computer system 112). For example, viewing habit information can be "sampled" over relatively short periods (e.g., every 10 seconds) and subsequently compiled into the history file. This relatively large history file can be stored on the mass storage device and later sent up-stream as described above. The history is retrieved periodically, depending upon its size.

As described above, the history file is sent to some central facility outside the user's home AV network via modem connection 135. This type of up stream communication is advantageous in that it closely fits the typical home connectivity condition. The typical home accesses communication networks (e.g., the internet) via dial-up connections over ordinary telephone lines. The connection is established through, for example, an internet service provider (ISP). Hence, the connection cannot be maintained for extended periods. Modem 134 dials the ISP, establishes a connection, transmits the data, relinquishes the connection, and subsequently "hangs up" the phone line. The use of "always on" technology, such as cable modems, DSL (digital subscriber line), and the like, may change the paradigm by rendering dial-up access obsolete. Such changes are several years away, and in the event of their occurrence, the present invention can be readily adapted to use them to best advantage.

Figure 2:
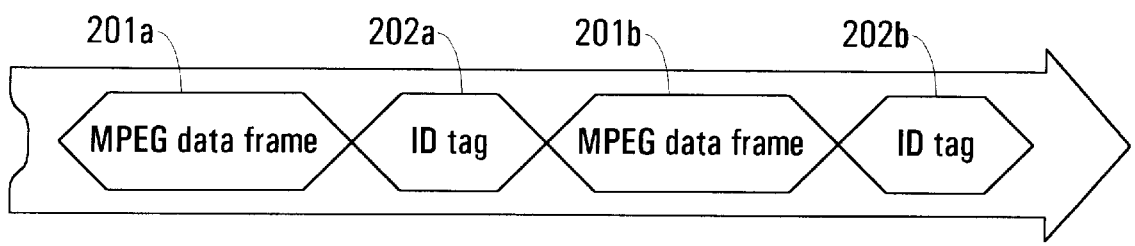
FIG. 2 shows a portion of an MPEG broadcast data stream in accordance with one embodiment of the present invention.

Referring now to FIG. 2, a portion of an MPEG broadcast data stream 200 is shown. Broadcast data stream 200 includes a plurality of MPEG data frames, for example MPEG data frames 201a and 201b, and a plurality of interleaved ID tags, for example, ID tags 202a and 202b. Broadcast data stream 200 conveys compressed video information between devices 121–126. For example, broadcast data stream 200 can be used to transport video information from set top box 125 to receiver 122 and television 121. As described above, ID tags 202a–202b are snooped by the monitor program to collect the desired information. ID tags 202a–202b provide identifying information regarding the nature of broadcast data stream 200 (e.g., program originator, program name, etc.). ID tags 202a–202b can be simple numerical identifiers (e.g., CNN=12345678910) or can include more complex information.

For example, receiver 122 (which executes the monitor program on its embedded computer system) can periodically monitor its output data stream (e.g., broadcast data stream 200) to snoop the included ID tags once every X seconds, where X is the monitoring interval, or the "resolution" of the data collection. Receiver 122 compiles the sampling information received from the snooping into a history file which is stored and sent at a later time. Alternatively, depending upon the up-stream connectivity, the sampling information can be sent immediately.

Referring now to FIG. 3, a history file 300 in accordance with one embodiment of the present invention is shown. In this embodiment, history file 300 includes a numerical identifier 301 for the sampled ID tag, the start time 302 for the particular program (as determined by the sampling) and the stop ti me 303 for the particular program (as determined by the sampling). As depicted, history file 300 can include numerous entries, as determined by the desired resolution of the sampling. The shorter the sampling interval, the faster history file 300 increases in size. As described above, history file can include numerous other characteristics regarding the output data stream being sampled. The ID tag numerical identifier, start time, and stop time are only three of numerous possible data items which can be cataloged (depending upon the complexity of the ID tags). As such, it should be apparent to one skilled in the art that numerous optimizations of history file 300 are possible.

For example, one optimization is to store only the new occurrence of an ID tag and the time it first appeared on the output of receiver 122, set top box 125, multi-disc DVD player 123, etc. The next change (e.g., selection of a different service or turning off home AV network 120) marks the duration of the selected item. Alternatively, very frequent transmission of history file 300 can give the recipients a more "real time" view of what is happening in the market. For example, when a pilot TV program is airing, it would be possible to know when people tuned in/out. A live broadcast (e.g. Jerry Lewis Telethon) can monitor viewing habits against calls and donation. Similar monitoring can occur for home shopping, etc.

The data collection also has benefits to the user. By examining the hardware and software on home AV network 120, a utility program (also executing on, for example, receiver 122) could inform the user about associated products which might be of interest (marketing & promotion). The utility program could monitor a vendor's web site (or other remote location) and automatically notify the user if hardware upgrades or product recalls might be available, based on analysis of the product on the network. The product manufacturers which support data mining can generate revenue by charging the companies who use this data, as it is collected and sent to them.

It should be noted that the present invention is well suited for use with the well-known and widely-supported AV/C protocol for home AV networks. An AV/C-compliant tuner can readily execute the monitor program of the present invention and thereby support the data collection processes of the present invention. Specifically, as is known by those skilled in the art, the AV/C protocol is being defined for the functionality of an AV/C modem subunit. An AV/C modem subunit can be configured by the monitor program for transmission of history file 300 at any desired interval to support a desired sampling resolution.

It should also be noted that the ID tags (e.g., ID tags 202a–202b) interleaved in a broadcast data stream (e.g., broadcast data stream 200) can be a standard field in the AV/C broadcast data descriptors (as defined in the AV/C specification). Simple applications can read the descriptors to obtain the ID tags, thereby eliminating the need to decode the broadcast data stream.

The implementation of the present invention in an AV/C protocol environment is described below. However, as discussed above, it should be appreciated that the data collection process of the present invention is suited for use with other home AV network protocols. Similarly, though the present invention is described above as implemented on a IEEE 1394 based network, other types of networking technology can be used while remaining within the scope of the present invention.

To implement the present invention in an AV/C environment, AV/C controllers within the AV/C-based home AV network use the DIRECT SELECT DATA command of the AV/C tuner subunits (in this case, receiver 122) to specify that the desired ID tags should be output.

For example, receiver 122 (as an AV/C controller) issues a DIRECT SELECT DATA command to, for example, set top box 125 (e.g., an AV/C tuner subunit), specifying that the ID tag for CNN be appended source plug 1 of the AV/C tuner subunit. Presumably, receiver 122 had already established the necessary connections between this plug and the desired destination, either a storage or processing device, or perhaps a communications subunit for direct transmission back to the interested party. The specification of the CNN tag would be according to the broadcast system (e.g. DVB, ATSC, etc.). This information can be derived by analyzing the associated Service Information for the service of interest (CNN), and parsing through the MPEG data. This action is well known to controllers which deal with broadcast data. The specific details of the AV/C tuner commands can be found in the AV/C documentation, which is available from the IEEE 1394 Trade Association.

An alternate AV/C-based embodiment would be for the tuner (e.g., set top box 125) to provide an object list structure (according to the rules defined in the AV/C documentation), where some of the objects represent the unique data tags which are currently in the air. For the controller (e.g., receiver 122), it is a simple matter of sending the OBJECT NUMBER SELECT command to the AV/C tuner to achieve the same result. However, this method is easier for the controller because it does not have to parse or snoop the MPEG data stream to find the necessary information for selecting the ID tag of CNN. It simply refers to the appropriate object descriptor provided by the tuner and requests that it be sent to a specified output plug. The rules for the OBJECT NUMBER SELECT command are also in the AV/C documentation.

An alternate embodiment for the ID tags would be to keep track of which PID (program ID) values are being selected as opposed to broadcasting separate ID tags. However, this might be more difficult to keep track of, because PID values might change (for the same broadcast content) over time.

As described above, in addition to broadcast information, other types of information can be gathered and retrieved by the present invention. For example, the AV/C self-describing data fields such as model-ID, which can be found in the configuration ROM of some devices, can be used as a marketing tool. In this case, a device vendor would know their model-ID codes stored in the data fields, so they know what kinds of products are in the AV network and what other products can be used with them. Of course, any unique value can be placed in devices and read by the monitor program.

Another example is to determine which revision of a particular product is being used in the user's home AV network. In this case, the hardware version ID field, which is defined by the IEEE 1212 standard, can be used to distinguish between manufacturing revisions of a product (of the same model-ID value). If there happens to be a problem with a manufacturing run of products, the data mining utility application can monitor a web site and look for the posting of certain hardware version ID values. When it finds a match, it can warn the user that the product may need servicing, or even give supplemental information about how to contact the manufacturer regarding the nature of any problem.

Another example is automatic product registration, where the data collection process of the present invention presents on-screen product registration forms. In some instances, the monitor program can even partially fill the registration form out for the user (such as model ID, etc.). Other SDD (self-describing data) fields which could be useful are the model-serial-number, vendor-URL, vendor-name, model-name, etc. These items can be included in the device's configuration ROM and used for the automatic filing of product registrations via the up-stream channel. The completed form could even be sent to the location specified by the vendor URL on the internet.

Figure 4:
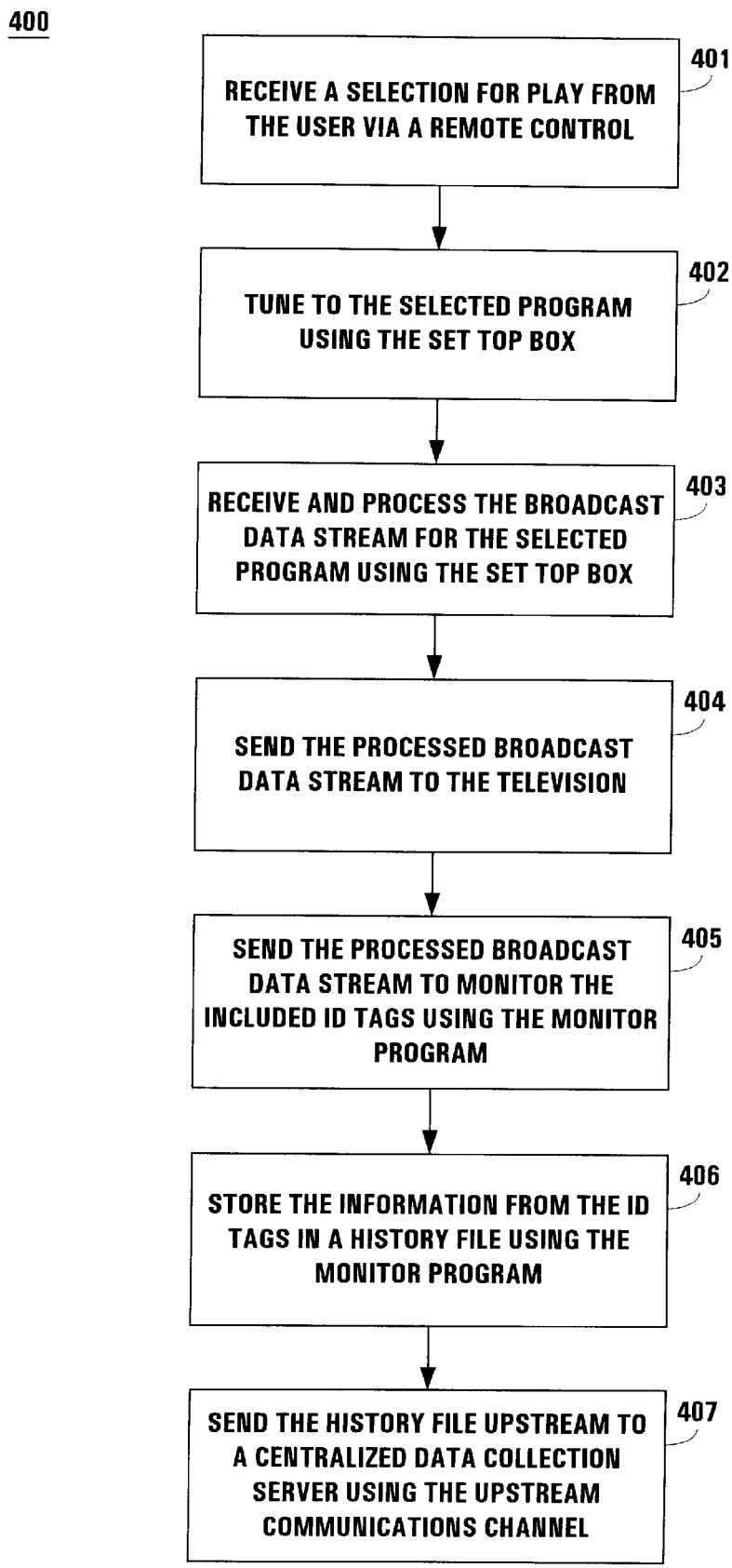
FIG. 4 shows a flow chart of the steps of a television viewing data collection process in accordance with one embodiment of the present invention.

Referring now to FIG. 4, a flow chart of the steps of a process 400 in accordance with one embodiment of the present invention is shown. Process 400 depicts the steps involved in collecting viewing information about a program selected for viewing by a user of home AV network 120 of FIG. 1B. Specifically, process 400 depicts the process of collecting the program information as the broadcast data stream is being received via set top box 125.

Process 400 begins in step 401 where receiver 122 receives a selection for play from the user via the receiver's remote control unit. The selection (e.g., for a pay-per-view movie) communicated from receiver 122 to set top box 125 via AV/C protocols and IEEE 1394 communication links 130c and 130b. In step 402, set top box 125 receives the selection from receiver 122 and tunes to the selected program. In step 403, the program is received via cable TV line 136a and processed (e.g., decoded, demodulated, etc.). In step 404, the processed broadcast data stream is sent to television monitor 121 for display to the user.

Referring still to process 400 of FIG. 4, in step 405, the processed broadcast data stream is snooped by the monitor program as described above. The monitor program (in this case, executing within the embedded computer system 112 of receiver 122) parses the processed output data stream to extract the ID tags (e.g., ID tags 202a–202b) included therein. As described above, these unique ID tags are inserted into the broadcast data stream by the broadcasting facility beyond the up-stream end of cable TV line 136. In step 406, the information gained from the ID tags is stored in a history file (e.g., history file 300 of FIG. 3) by the monitor program. Then, in step 407 the history file is transmitted up-stream using the up-stream communications channel to a centralized data collection server at, for example, the cable television company's facility.

Figure 5:
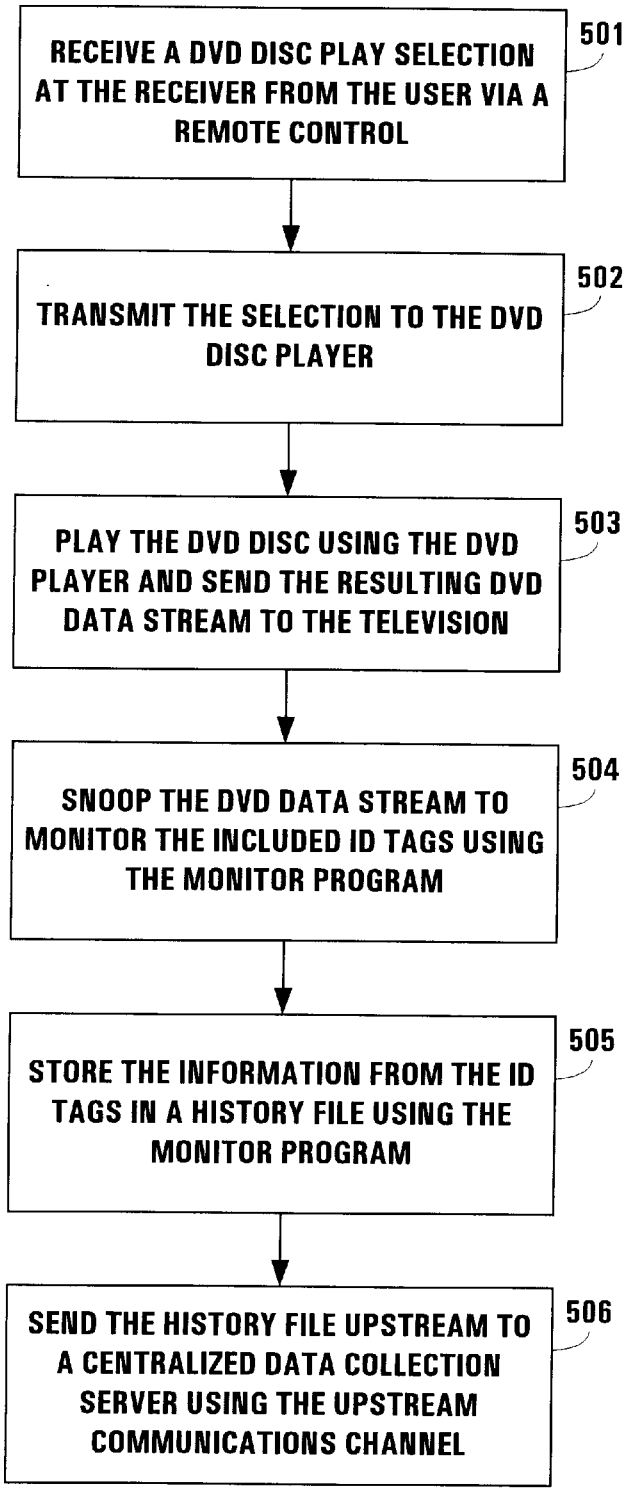
FIG. 5 shows a flow chart of the steps of a DVD disc play history data collection process in accordance with one embodiment of the present invention.

FIG. 5 shows the steps of a process 500 in accordance with one embodiment of the present invention. Process 500 is substantially similar to process 400 except that process 500 shows the steps involved in selecting a DVD disc loaded on the multi-disc DVD player 123 for viewing by the user, as opposed to selecting a program for reception via cable TV line 136.

Process 500 begins in step 501, where a DVD play selection from the user is received by receiver 122 via its remote control. In step 502, the selection is transmitted to the multi-disc DVD player 123 for playing. In step 503, the selected DVD disc is played, and the resulting DVD data stream (e.g., MPEG) is sent to the television monitor. In step 504, the data stream is snooped using the monitor program to retrieve the information carried by the included ID tags. In step 505, the information is stored in a history file in an appropriate format (e.g., the desired level of resolution), and in step 506, the history file is sent up-stream to the centralized data collection server. Thus, process 500 is substantially similar to process 400, except for the fact that the data stream source is a DVD disc as opposed to being a broadcast received across cable TV line 136.

Figure 6:
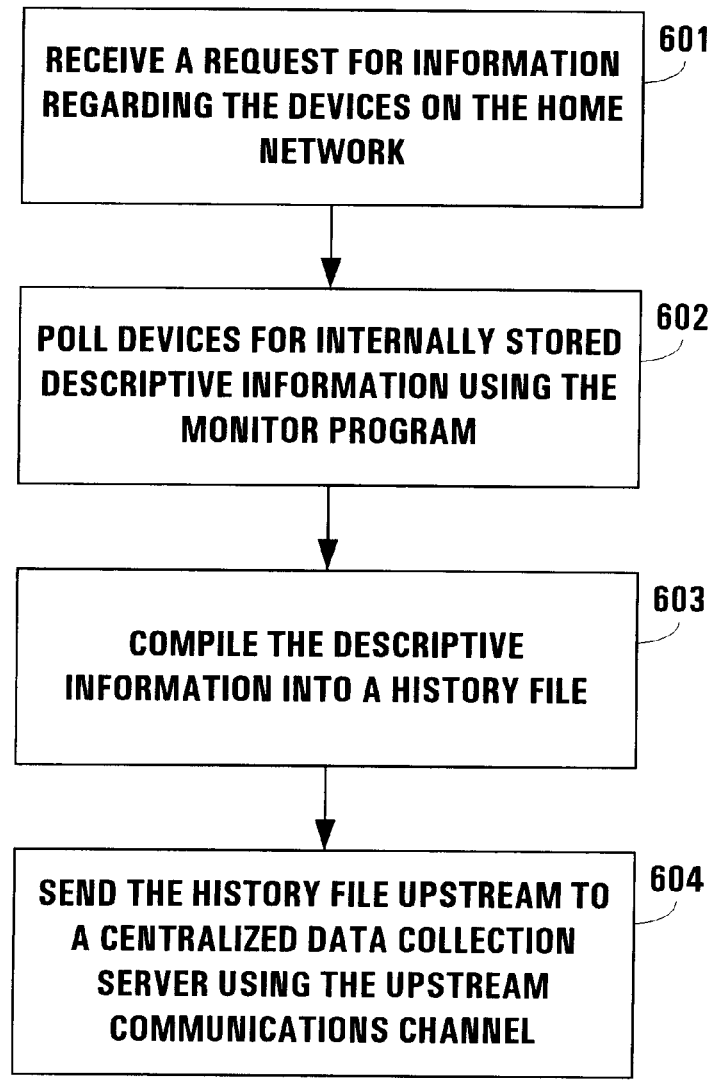
FIG. 6 shows a flow chart of the steps of a device configuration data collection process in accordance with one embodiment of the present invention.

Referring now to FIG. 6, a flow chart of the steps of a process 600 in accordance with another embodiment of the present invention is shown. Process 600 shows the steps involved in collecting data about the configuration, version, status, etc. of the various devices within the user's home AV network (e.g., home AV network 120). As opposed to collecting data about the user's viewing or listening habits as with processes 400 and 500, process 600 collects configuration data about the devices coupled to the home AV network and forwards this information to a central collection facility.

Process 600 begins in step 601, where a request for information regarding the configuration of the network is received from an external source. The request can come from a number of sources in a number of different manners. For example, the home AV network might receive the request from a manufacturing facility attempting to design a software patch for a software driver used in the home AV network. The request might come from a newly-installed software program of a new device being coupled to the home AV network. In step 602, in response to the request, the monitor program polls the devices on the home AV network to access internally stored descriptive information. As described above, such information can include the software version number, firmware version number, time since last update, and the like. In step 603, the information collected by the monitor program is compiled into a history file, and in step 604, the history file is sent up-stream in the same manner as with processes 400 and 500.

Thus, the present invention provides a solution which leverages the intelligence of the latest home AV network devices for the purposes of data collection and retrieval. The system of the present invention functions seamlessly with modern home AV networks and is readily extensible, self-configuring, and capable of accommodating new devices, even though the capabilities and features of the devices can be unknown. The present invention is compatible with the well-known and widely-supported AV/C protocol, and as such, the present invention is extensible to accommodate new devices as they are added to a home AV network over its life time. Consequently, the present invention can guarantee that all such AV/C-compliant devices can be communicated with, controlled, and enjoyed by the user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A data collection system for use with a home AV network, comprising:

a plurality of consumer electronic devices communicatively coupled via an IEEE 1394 based network;

a receiver device included in the plurality of devices, the receiver device operable for receiving a broadcast data stream, wherein the broadcast data stream includes an identifier tag describing the identity of the broadcast data stream;

an up-stream communications link included in one of the plurality of devices; and a computer system included within one of the plurality of devices, the computer system including a processor coupled to a memory via a bus, the memory storing software which when executed by the processor cause the computer system to implement a method comprising the steps of:
   querying the plurality of devices included in the home AV network for descriptive information stored within the plurality of devices;
   monitoring the tag included in the broadcast data stream;
   determining an identity of the broadcast data stream using the identifier tag; and
   transmitting the identity of the broadcast data stream to an external monitor via the up-stream communications link.

2. The system of claim 1, wherein the plurality of consumer electronic devices communicate in accordance with AV/C protocols.

3. The system of claim 1, wherein the identifier tag is a numerical identifier included the broadcast data stream and wherein the tag is monitored by parsing the broadcast data stream.

4. The system of claim 3, wherein the broadcast data stream is an MPEG broadcast data stream.

5. The system of claim 1, wherein the identity of the broadcast data stream is determined periodically to obtain a history of the identity of the broadcast data stream over time, the history being stored in a history file.

6. The system of claim 5, further comprising:
   a mass storage device coupled to the computer system for storing the history file.

7. The system of claim 5 wherein the computer system is configured to periodically transmit the history file to the external monitor via the up-stream communications link.

8. The system of claim 1, wherein the computer system is programmable to determine the identity of the broadcast data stream periodically over a programmable interval.

9. The system of claim 1, wherein the up-stream communications link is a telephone modem.

10. An automatic data collection system including a home AV network device for use with a home AV network including a plurality of consumer electronic devices communicatively coupled via an IEEE 1394 bus, comprising;
   a home AV network device operable for receiving a broadcast data stream, wherein the broadcast data stream includes an identifier tag describing the identity of the broadcast data stream;
   a computer system included within the home AV network device, the computer system including a processor coupled to a memory via a bus, the memory storing software which when executed by the processor cause the computer system to implement a method comprising the steps of:
     querying the plurality of devices included in the home AV network for descriptive information stored within the plurality of devices;
     monitoring the tag included in the broadcast data stream;
     determining an identity of the broadcast data stream using the identifier tag; and
     transmitting the identity of the broadcast data stream to an external monitor via an up-stream communications link.

11. The system of claim 10, wherein the home AV network device communicates with the plurality of consumer electronic de vice s in accordance with AV/C protocols.

12. The system of claim 10, wherein the identifier tag is a numerical identifier included the broadcast data stream and wherein the tag is monitored by parsing the broadcast data stream, and wherein the identity of the broadcast data stream is determined periodically to obtain a history of the identity of the broadcast data stream over time, the history being stored in a history file.

13. The system of claim 12, wherein the home AV network device further includes a mass storage device coupled to the computer system for storing the history file.

14. The system of claim 12, wherein the computer system is configured to periodically transmit the history file to the external monitor via the up-stream communications link.

15. The system of claim 10, wherein the computer system is programmable to determine the identity of the broadcast data stream periodically over a programmable interval.

16. The system of claim 10, wherein the home AV network device is an AV/C compliant set-top box adapted for use with a cable television connection.

17. The system of claim 10 wherein the descriptive information includes serial number data for respective devices coupled to the home AV network and wherein the serial number data is compiled into a file and transmitted to the external monitor via the upstream communications link.

18. The system of claim 10, wherein the descriptive information includes manufacturing revision data for respective devices coupled to the home AV network and wherein the manufacturing revision data is compiled into the history file and transmitted to the external monitor via the up-stream communications link.

19. The system of claim 10, wherein the descriptive information includes an AV/C hardware version ID field for respective devices coupled to home AV network.

20. The system of claim 10, wherein the home AV network device is implemented as a cable television set-top box.

21. A method for automatic data collection in a home AV network including a plurality of consumer electronic devices communicatively coupled via an IEEE 1394 bus, the method comprising the steps of:
   receiving a broadcast data stream using a receiver device, wherein the broadcast data stream includes an identifier tag describing the identity of the broadcast data stream;
   monitoring the tag included in the broadcast data stream using a computer system included within the receiver device, the computer system including a processor coupled to a memory via a bus;
   querying the plurality of devices included in the home AV network for descriptive information stored within the plurality of devices, the querying performed by the computer system;
   determining an identity of the broadcast data stream using the identifier tag; and
   transmitting the identity of the broadcast data stream to an external monitor via an up-stream communications link.

22. The method of claim 21, wherein the receiver device communicates with the plurality of consumer electronic devices in accordance with AV/C protocols.

23. The method of claim 21, further including the steps of:
   parsing the broadcast data stream to monitor the identifier tag, wherein the identifier tag is a numerical identifier included the broadcast data stream;
   determining the identity of the broadcast data stream periodically to obtain a history of the identity over time; and storing the history in a history file.

24. The method of claim 23, wherein the broadcast data stream is an MPEG broadcast data stream.

25. The method of claim 23, wherein the receiver device further includes a mass storage device coupled to the computer system for storing the history file.

26. The method of claim 23, wherein the computer system is configured to periodically transmit the history file to the external monitor via the up-stream communications link.

27. The method of claim 23, wherein the computer system is programmable to determine the identity of the broadcast data stream periodically over a programmable interval.

28. An automatic data collection system including a home AV network device for use with a home AV network including a plurality of consumer electronic devices communicatively coupled via an IEEE 1394 bus, comprising:
   an AV/C compliant home AV network device operable for receiving an MPEG broadcast data stream, wherein the broadcast data stream includes an identifier tag describing the identity of the broadcast data stream;
   a computer system included within the home AV network device, the computer system including a processor coupled to a memory via a bus, the memory storing software which when executed by the processor cause the computer system to implement a method comprising the steps of:
   querying the plurality of devices included in the home AV network for descriptive information stored within the plurality of devices, the querying performed via the IEEE 1394 bus;
   retrieving the descriptive information via the home AV network;
   compiling the descriptive information into a history file;
   transmitting the history file to an external monitor via an up-stream communications link.

29. The system of claim 28, wherein the home AV network device communicates with the plurality of consumer electronic devices in accordance with AV/C protocols.

30. The system of claim 28, wherein the home AV network device further includes a mass storage device coupled to the computer system for storing the history file.

31. The system of claim 28, wherein the computer system is configured to periodically transmit the history file to the external monitor via the up-stream communications link.

* * * * *